(12) United States Patent
Claire et al.

(10) Patent No.: US 11,905,063 B1
(45) Date of Patent: *Feb. 20, 2024

(54) SYSTEMS AND METHODS FOR CUTTING LABEL MATERIAL

(71) Applicant: Elum Inc., Turlock, CA (US)

(72) Inventors: Ranbir Singh Claire, Livingston, CA (US); Vinay Leeladhar Piratla, Turlock, CA (US); Karmen Claire, Livingston, CA (US)

(73) Assignee: Elum Inc., Modesto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,183

(22) Filed: Feb. 6, 2023

Related U.S. Application Data (63) Continuation of application No. 17/396,712, filed on Aug. 8, 2021, now Pat. No. 11,572,214, which is a continuation of application No. 16/889,515, filed on Jun. 1, 2020, now Pat. No. 11,091,288, which is a continuation of application No. 15/615,805, filed on Jun. 6, 2017, now Pat. No. 10,669,057.

(51) Int. Cl.
*B65C 9/18* (2006.01)
*B65C 9/42* (2006.01)
*B32B 43/00* (2006.01)
*B26D 1/40* (2006.01)
*B26D 1/38* (2006.01)

(52) U.S. Cl.
CPC ............ *B65C 9/1807* (2013.01); *B26D 1/385* (2013.01); *B26D 1/405* (2013.01); *B32B 43/003* (2013.01); *B65C 9/42* (2013.01); *B65C 2009/1861* (2013.01)

(58) Field of Classification Search
CPC . B65C 9/1807; B65C 9/42; B65C 2009/1861; B32B 43/003; B26D 1/385; B26D 1/405
See application file for complete search history.

(56) References Cited

U.S. PATENT DOCUMENTS

| | | | | |
|---|---|---|---|---|
| 4,076,786 A | * | 2/1978 | Amberg ................ | B65C 9/1819 264/145 |
| 6,149,755 A | * | 11/2000 | McNichols ............ | B65H 39/14 156/580.2 |
| 11,091,288 B1 | * | 8/2021 | Claire .................... | B26D 1/385 |
| 11,572,214 B1 | * | 2/2023 | Claire .................... | B26D 1/405 |

* cited by examiner

*Primary Examiner* — George R Koch
*Assistant Examiner* — Christopher C Caillouet
(74) *Attorney, Agent, or Firm* — Temmerman Law; Mathew J. Temmerman (57) ABSTRACT

The present invention is an apparatus and method for cutting individual label strips from a roll of label web utilizing a cutter assembly. A label cutter comprises a cutter assembly for continuously and independently controlling the rotational speeds of a rotating cutter shaft, a stationary shaft, and a label feed roller is provided. The length of the label strip is controlled by the distinct speed of rotation of a stationary knife, the stationary knife is rotatably coupled to the stationary shaft. At least one cutter blade is operatively associated to the rotating cutter shaft for cutting the label web. The stationary knife rotates with a to speed of rotation different from the speed of rotation of the cutter blade to produce longer or shorter label length strips. The frequency at which the cutter blade meets the stationary knife is inversely related to the length of the label strip that is produced during cut off.

20 Claims, 13 Drawing Sheets

SYSTEMS AND METHODS FOR CUTTING LABEL MATERIAL

RELATED APPLICATIONS

This application is a continuation application of U.S. patent application Ser. No. 17/396,712 filed Aug. 8, 2021 and granted as U.S. Pat. No. 11,572,214 on Feb. 7, 2022, and which was a continuation of U.S. patent application Ser. No. 16/889,515 filed Jun. 1, 2020 and granted as U.S. Pat. No. 11,091,288 on Aug. 17, 2021, which is a continuation of Ser. No. 15/615,805 filed Jun. 6, 2017 and granted on Jun. 2, 2020 as U.S. Pat. No. 10,669,057, the disclosures of all of which are incorporated in full.

BACKGROUND OF THE DISCLOSURE

Technical Field of the Disclosure

Description of the Related Art

A label is a strip of material attached to an object that is marked with information relevant to and for differentiating an object. The most common form of label is that of a flexible material such as paper or imprintable plastic film that is coated on a first side with an adhesive backing material and on a second side bears indicia relating to the object. Labeling systems are used in a wide variety of manufacturing operations to apply labels on a product, and more specifically, labeling machines are used to apply the label to a container for identification and/or aesthetic reasons. A labeling machine can rapidly change the size of labels cut from a web of labels to match containers of varying diameters, which are then fed onto containers moving along a conveyor. Roll fed labeling is recognized to be more economical labeling means, but the complexity of the labeling machine is increased due to the need to control the feed and cutting of the label stock. The complexity of the labeling procedure has also increased as new labeling materials are developed.

There is a growing demand for improved label cutting mechanisms. Different methods and systems are developed in the art to label products. In some conventional systems, labels may be die-cut in a preliminary stage long before a carton application or other use stage. For this, endless rolls comprising labels are provided, and these endless rolls are drawn onto a counter-cutting roller. It is to be understood that endless rolls are not truly endless, but instead the term is used to indicate many hundreds or thousands or more labels on a roll. These "endless" labels are then cut into individual labels and glued onto the containers. In order to cut these label strips, counter-cutting rollers have counter-cutting channels which in turn cooperate with blades, wherein these blades are arranged on a further cutting rotor.

Another conventional approach that suggests a labeling machine for labeling containers may include at least one label roll, a label feeder, a cutting device, a gripper cylinder, and at least one gluing mechanism. The cutting device is constituted by a rotating vacuum roll, a cutter and a rotating parting element, the parting element having at least one parting tool on its circumference. The rotating vacuum roller comprises four counter elements, the four counter elements are so arranged that three counter elements are mounted on the circumference of the rotating vacuum roller with a respective spacing of 120°, and the fourth counter element has a spacing of 180° from one of the three counter elements, and wherein the label lengths correspond to one times the circumference, two thirds of the circumference, one half of the circumference, or one third of the circumference of the vacuum roller. Hence, the longest label that could be feed without losing tension in the web between the cutter and the label feed roller is determined by the circumference of the cutter.

Another conventional approach disclosed is a labeling machine having a feed mechanism to feed a strip of labels along a predetermined label path and into engagement with a label carrier, and a cutter assembly located in the path for severing labels from the strip. This conventional apparatus further comprises a knife arrangement in which a stationary knife is inclined to the axis of rotation of a rotating knife to achieve a progressive cut across the width of the label. This arrangement achieves complete cutting of the label without premature wear of the cutting edge. With this arrangement the label is engaged by a drum prior to severing and a tension induced in the label by rotating the drum at a greater peripheral speed than the feed rate of the label roll. However, this method does not depend on the number of rotations of the cutter before cutting the label. Moreover, the stationary knife is not equipped to cuts on demand and does not ensure desired length of label strips.

Another approach provides a labeling machine that can rapidly change the size of labels cut from a web of labels to match different diameter containers which are then fed onto containers moving along a conveyor. A cutter roll frame comprises a vertically oriented cutter roll having a diameter selected for a predetermined sized label for a predetermined sized container and having upper and lower ends and wherein the central axis of the cutter roll is spaced farther from the drive for any successive larger diameter cutter roll that is selected when a predetermined sized label is to be cut. With this method, smaller labels require the use of a smaller cutter roll spaced closer to the label drum, while a larger label requires the use of a large diameter cutter roll spaced farther from the label drum. The cutter assembly is designed to allow rapid change of cutter roll diameter to change the size of labels cut from a web of labels to match different diameter containers. Here, the size of the cutter defines the label length. Therefore, the cutter diameter needs to be varying in order to feed different label lengths. This presents the compound problem of having to design and pay for a different cutter roller for each and every label length as well as requiring mechanical disassembly and reassembly of the cutter every time the label size is changed. Further, based on the label pitch (number of labels per unit distance of the label stock), the diameter of the cutter roller must be changed. There are physical limitations to the maximum and minimum diameters of the cutter roller. Typically, a change in cutters can take many hours. Furthermore, when the diameter of the cutter roller is changed, the linear velocity changes proportionally.

Yet another conventional approach describes a label cutter mechanism that is designed to operate at a constant speed to cut a particular size of label. The label cut-off is optimized when the label speed and surface speed of the label cutter are matched during the cutting step. The surface speed of the vacuum drum is greater than the average speed of the label web because individual labels are spaced from each other on the vacuum drum. Ideally, label segments should move at the same speed as the vacuum drum at the time of label transfer. With such systems, system optimization is not possible because the optimum speed of the cutter during label transfer is different than the optimum speed for label cut-off. Once labels have been severed by the cutter, they are individually handled and supported by a vacuum drum. The vacuum drum is preferably rotated at a higher rate of surface speed than the surface speed of the cutter. Hence, this method does not employ adjusting the relative speed of the cutter and knife in order to obtain the labels on demand. If the relative speed of the cutter is not properly set, the vacuum drum can snap the label segment from the cutter, causing the label to shift. If the label shifts during transfer, it can result in misalignment of the label on the container.

Therefore, there is a need for a system and method to feed different label lengths without changing cutter diameters. Such a system would provide label length as required and should depend upon the number of rotations of the cutter. Such a system would include a stationary knife, which cuts on demand only. Such a needed system would further include a label cutter having servomotors that are independently is controlling operative elements of a labeling machine. Such a system would provide the relative speed of the primary blade which is directly related to the secondary blade. Moreover, such a system would control the amount of label fed by the feed roller to the cutter and thereby desired label length would be cut. Such a system would adjust the relative speed of the cutter and knife in order to provide varying label lengths. Finally, this needed system would feed the longest label without dependency on the circumference of the cutter and the surface speed of the cutter. The present embodiment overcomes shortcomings in this area by accomplishing these critical objectives.

SUMMARY OF THE DISCLOSURE

To minimize the limitations found in the prior art, and to minimize other limitations that will be apparent upon the reading of the specification, the present invention provides an apparatus and method for cutting individual label strips from a roll of label web utilizing a cutter assembly. The cutter assembly comprises a label feed roller, a rotating cutter shaft and a stationary shaft. The cutter assembly is mounted on a casted cutter frame and the label feed roller is rotatable within the frame. The rotating cutter shaft has a generally cylindrical shape and a first axis about which it rotates. The label feed roller is positioned adjacent the rotating cutter shaft and includes a label guide between which the label web is fed. The label web is further fed around the rotating cutter shaft which is guided by the label feed roller. At least one cutter blade extends in a generally vertical relationship from the periphery of the rotating cutter shaft. The at least one cutter blade co-operates with a fixed blade holder and may be operatively associated to the rotating cutter shaft for cutting the label web. The at least one cutter blade includes an elongated, linear knife wedge formed thereon. A stationary knife protrudes from and is rotatable with the stationary shaft. The stationary shaft has a second axis about which it rotates. A knife clamp is mounted on the stationary shaft for rotatably engaging the stationary knife. The label cutter apparatus further comprises a first servomotor that rotatably drives the rotating cutter shaft and a second servomotor that rotatably drives the stationary shaft. The length of the label strip is controlled by the distinct speed of rotation of the stationary knife. The stationary shaft rotates with the speed of rotation less than the speed of rotation of the rotating cutter shaft about its second vertical axis to produce a label length strip of a greater length.

The present invention also provides the method for cutting individual label strips from the roll of label web utilizing the label cutter apparatus. The method initiates by providing the label cutter assembly, wherein the label cutter assembly comprises the rotating cutter shaft, the stationary shaft, and the label feed roller. Initially, rotating the cutter shaft on the first axis at a generally constant rotational speed, then conveying the label web at a label feed rate to the rotating cutter shaft by means of the label feed roller. Next, allowing the label web to rotatably attach to the rotating cutter shaft. Further, enabling the cutter blade to rotate with the rotating cutter shaft. Then, rotating the stationary shaft on the second axis under distinct speed control and allowing the stationary knife to rotate along with the stationary shaft. Furthermore, the rotational speed of the rotating cutter shaft as well as the stationary shaft is varied during distinct intervals of a label cutting cycle. The label web is then cut by the stationary knife when the stationary knife has a lower rotational speed during the interval in the cycle. And finally transferring the label strip after cutting from the cutter assembly. The method further comprising establishing the label cutting cycle as a 360° rotation of the rotating cutter shaft at a single rotation of the stationary shaft, the label web is cut at a minimum label length. The length of label strip is inversely related to the frequency at which the cutter blade meets the stationary knife.

A first objective of the present invention is to provide a system and method for operating a label cutter which cuts individual label strips from a roll of label web.

A second objective of the present invention is to provide a mechanism for producing a label strip of any desired length using a cutter assembly without requiring tooling changes.

A third objective of the present invention is to provide a method to vary a length of a label strip during cut off from a roll of label web by controlling the distinct speed of rotation of a stationary knife.

A fourth objective of the present invention is to establish a label cutting cycle of varying rates of revolutions per unit time to provide a desired length of label strip.

These and other advantages and features of the present invention are described with specificity so as to make the present invention understandable to one of ordinary skill in the art

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE PREFERRED EMBODIMENT

In the following discussion that addresses a number of embodiments and applications of the present invention, reference is made to the accompanying drawings that form a part hereof, and in which is shown by way of illustrating specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below. The invention will now be described with reference to the accompanying drawing which does not limit the scope and the ambit of the invention. In the following discussion that addresses a number of embodiments and applications of the present invention, reference is made to the accompanying drawings that form a part hereof, and in which is shown by way of illustrating specific embodiments in which the invention may be practiced. It is to be understood that other embodiments may be utilized and changes may be made without departing from the scope of the present invention.

Figure 1:
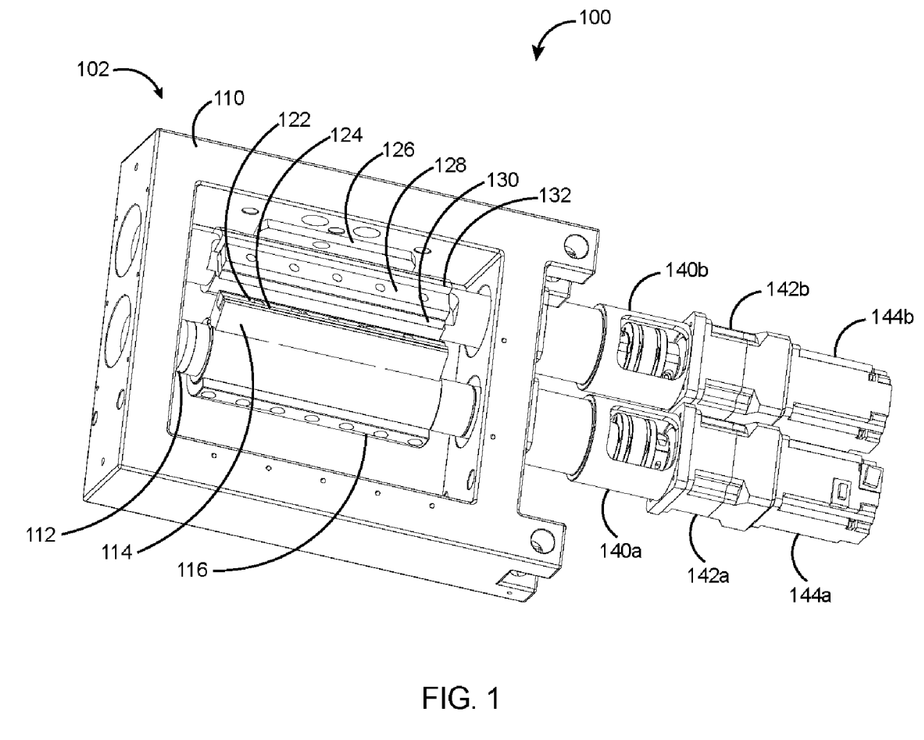
FIG. 1 is a front view of a label cutter in accordance with the preferred embodiment of the present invention.

Turning first to FIG. 1, a front view of a label cutter 100 embodying the concepts of the present invention. The label cutter 100 is an apparatus for cutting individual label strips from a roll of label web, the label cutter 100 comprising a cutter assembly 102, a first servomotor 144a and a second servomotor 144b. The cutter assembly 102 comprises a label feed roller 156 (shown in FIG. 3), a rotating cutter shaft 112 and a stationary shaft 132. The cutter assembly 102 is mounted on a casted cutter frame 110 and the label feed roller 156 (shown in FIG. 3) is rotatable within the frame 110. The rotating cutter shaft 112 having a generally cylindrical shape and having a first axis (not shown) about which it rotates. The label feed roller 156 (shown in FIG. 3) is positioned adjacent the rotating cutter shaft 112 and includes a label guide 150 (shown in FIG. 3) between which the label web is fed. The label web is further fed around the rotating cutter shaft 112 guided by the label feed roller 156 (shown in FIG. 3). At least one cutter blade 124 extends in a generally vertical relationship from the periphery of the rotating cutter shaft 112. The at least one cutter blade 124 co-operates with a fixed blade holder 114 and is operatively associated to the rotating cutter shaft 112 for cutting the label web. The at least one cutter blade 124 includes an elongated, linear knife wedge 122 formed thereon. A stationary knife 130 protrudes from and rotatable with the stationary shaft 132. The stationary shaft 132 has a second axis (not shown) about which it rotates. A knife clamp 128 is mounted on the stationary shaft 132 for rotatably engaging the stationary knife 130. A counterweight means 116 is attached to the rotating cutter shaft 112, the counterweight means 116 acting to counterbalance the tension of the label web in order to keep the rotating cutter shaft 112 against the label web. A cutter plate 126 is attached between the stationary shaft 132 and casted cutter frame 110. The label cutter apparatus 100 further comprises a first servomotor 144a that rotatably drives the rotating cutter shaft 112 and a second servomotor 144b that rotatably drives the stationary shaft 132. The first servomotor 144a is held by a first servo adapter 140a that is electrically connected by a first gear box 142a. The second servomotor 144b is held by a second servo adapter 140b that is electrically connected by a second gear box 142b.

Figure 2:
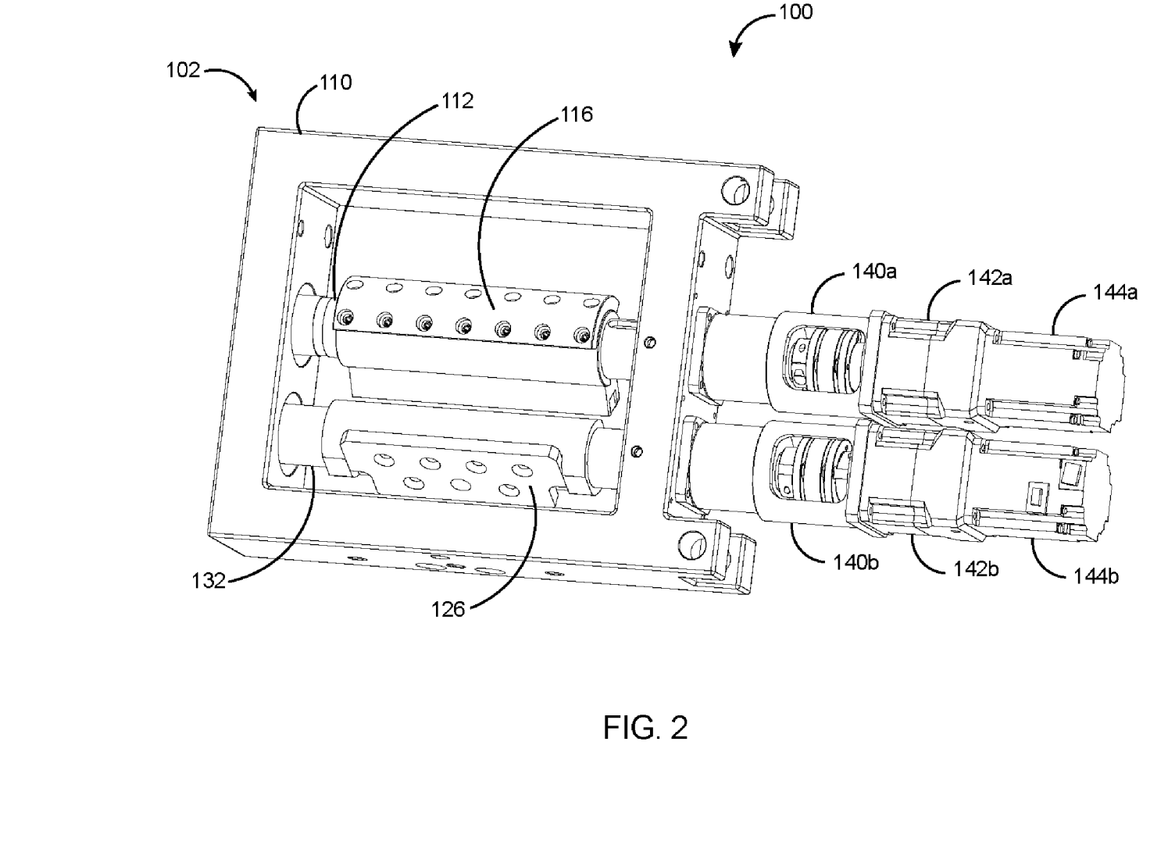
FIG. 2 is a rear view of a label cutter shown in FIG. 1 in accordance with the preferred embodiment of the present invention.

FIG. 2 illustrates a rear view of the label cutter 100 shown in FIG. 1 embodying the concepts of the present invention. The label cutter 100 cuts the individual label strips from the roll of label web before applying them into a container, the label cutter 100 comprising the cutter assembly 102, the first servomotor 144a and the second servomotor 144b. The cutter assembly 102 comprises the label feed roller 156 (shown in FIG. 3), the rotating cutter shaft 112 and the stationary shaft 132. The cutter assembly 102 is mounted on the casted cutter frame 110 and the label feed roller 156 (shown in FIG. 3) is rotatable in the frame 110. The rotating cutter shaft 112 has a cylindrical shape and a first axis (not shown) about which it rotates. The label feed roller 156 (shown in FIG. 3) is positioned adjacent the rotating cutter shaft 112 and includes the label guide 150 (shown in FIG. 3) between which the label web is fed. The label web is further fed around the rotating cutter shaft 112 guided by the label feed roller 156 (shown in FIG. 3). The cutter plate 126 is attached between the stationary shaft 132 and casted cutter frame 110. The counterweight means 116 is attached to the rotating cutter shaft 112, the counterweight means 116 acting to counterbalance the tension of the label web in order to keep the rotating cutter shaft 112 against the label web. The label cutter apparatus 100 further comprises the first servomotor 144a that rotatably drives the rotating cutter shaft 112 and a second servomotor 144b that rotatably drives the stationary shaft 132. The first servomotor 144a is held by the first servo adapter 140a that is electrically connected by the first gear box 142a. The second servomotor 144b is held by the second servo adapter 140b that is electrically connected by the second gear box 142b.

Figure 3:
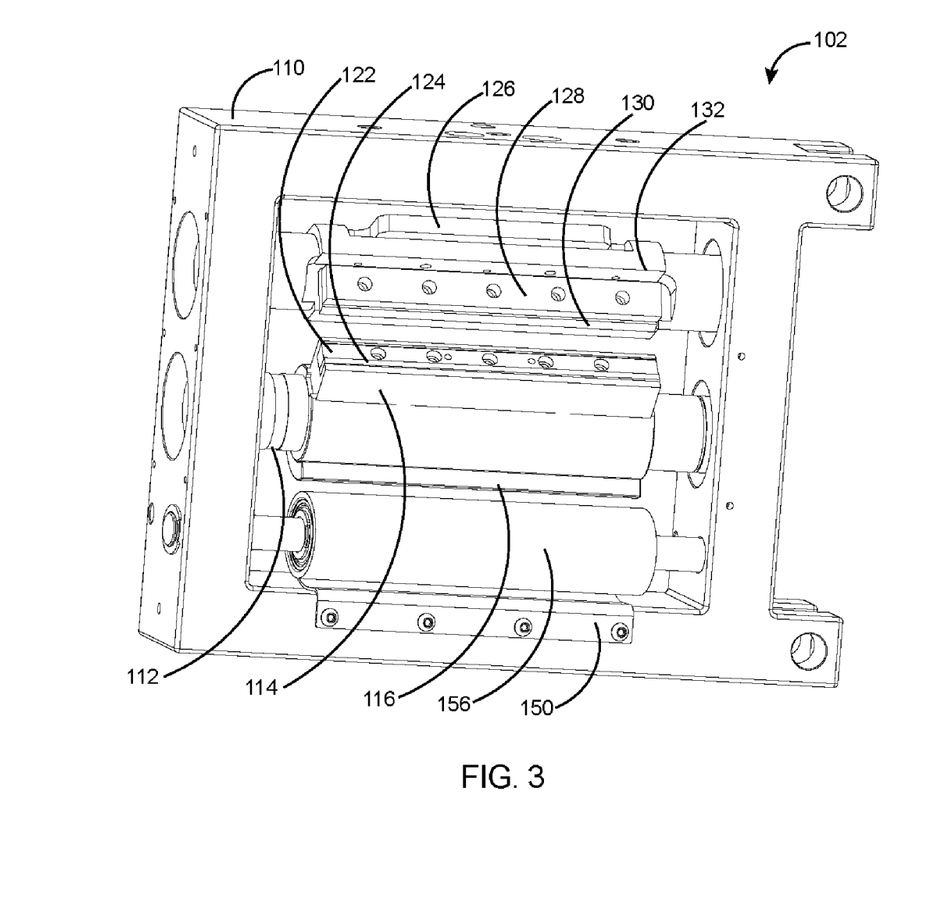
FIG. 3 is a detailed view of a cutter assembly shown in FIG. 1 in accordance with the preferred embodiment of the present invention.

FIG. 3 shows a detailed view of the cutter assembly 102 that is shown in FIG. 1 in accordance with the preferred embodiment of the present invention. The cutter assembly 102 comprises the label feed roller 156, the rotating cutter shaft 112 and the stationary shaft 132. The cutter assembly 102 is mounted on the casted cutter frame 110 and the label feed roller 156 is rotatable in the frame 110. The rotating cutter shaft 112 has a generally cylindrical shape and a first axis (not shown) about which it rotates. The label feed roller 156 is positioned adjacent the rotating cutter shaft 112 and includes the label guide 150 between which the label web is fed. The label web is further fed around the rotating cutter shaft 112 guided by the label feed roller 156. The at least one cutter blade 124 extends in a generally vertical relationship from the periphery of the rotating cutter shaft 112. The at least one cutter blade 124 co-operates with the fixed blade holder 114 and may be operatively associated to the rotating cutter shaft 112 for cutting the label web. The at least one cutter blade 124 includes the elongated, linear knife wedge 122 formed thereon. The stationary knife 130 protrudes from and is rotatable with the stationary shaft 132. The stationary shaft 132 includes the second axis (not shown) about which it rotates. The knife clamp 128 is mounted on the stationary shaft 132 for rotatably engaging the stationary knife 130. The counterweight means 116 is attached to the rotating cutter shaft 112, the counterweight means 116 acts to counterbalance the tension of the label web in order to keep the rotating cutter shaft 112 against the label web. The cutter plate 126 is attached between the stationary shaft 132 and casted cutter frame 110.

Figure 4:
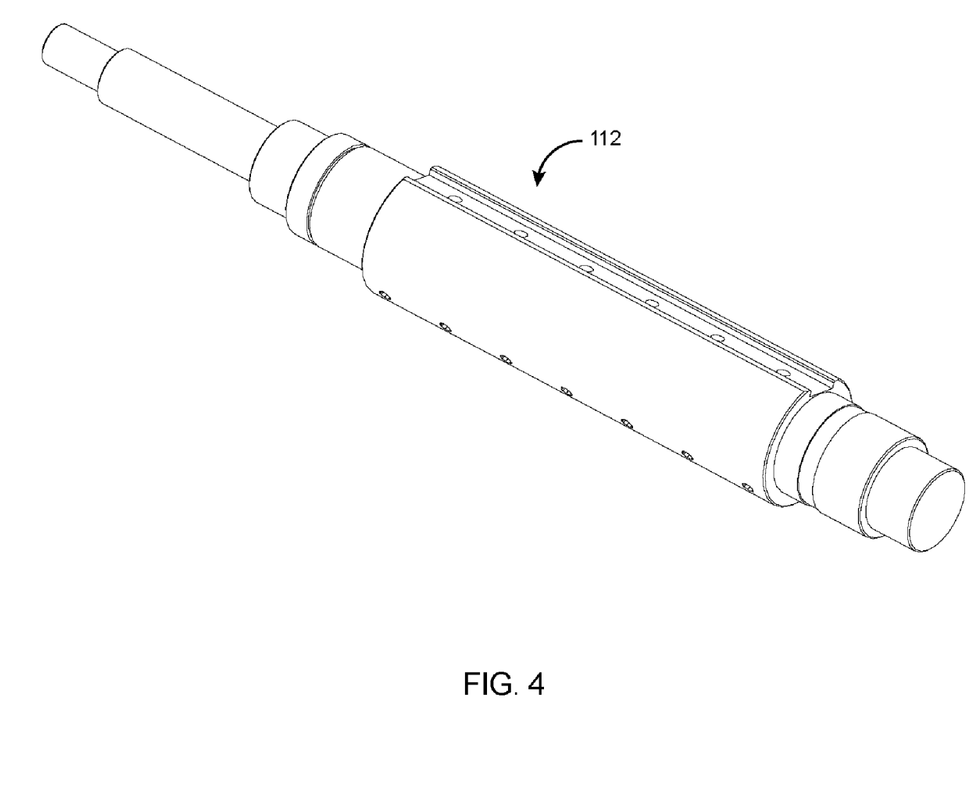
FIG. 4 is a view illustrating a rotating cutter shaft in accordance with the preferred embodiment of the present invention.

FIG. 4 illustrates the rotating cutter shaft 112 of the present invention. The rotating cutter shaft 112 has a generally cylindrical shape and the first axis about which it rotates. The at least one cutter blade 124 (shown in FIG. 1) co-operating with the fixed blade holder 114 (shown in FIG. 1) may be operatively associated to the rotating cutter shaft 112 for cutting the label web. The at least one cutter blade 124 (shown in FIG. 1) has an elongated, linear knife wedge 122 (shown in FIG. 1) formed thereon.

Figure 5:
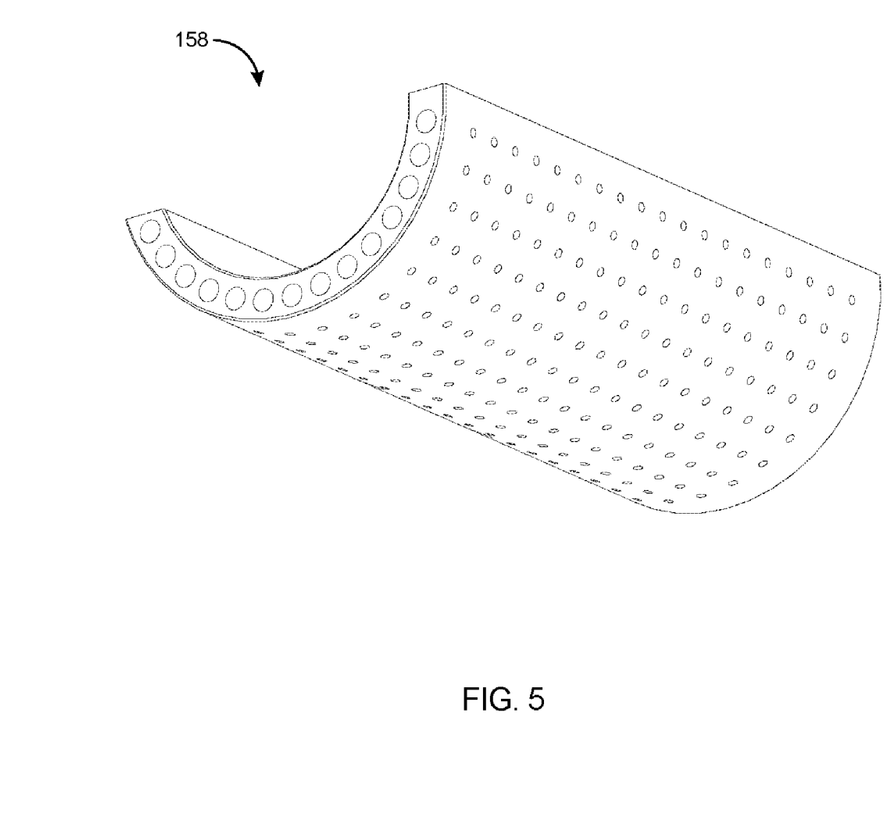
FIG. 5 is a perspective view of at least one cutter shell of the preferred embodiment of the present invention.

FIG. 5 illustrates the at least one cutter shell 158 of the present invention. The at least one cutter shell 158 is attached to the rotating cutter shaft 112 (shown in FIG. 1). The plurality of shell-shaped cutter shell 158 are integrally formed in and attached to the rotating cutter shaft 112 (shown in FIG. 1). The plurality of cutter shells 158 has symmetrical curved shaped shells oriented parallel to each other and also preferably provided in end-to-end arrangement around the rotating cutter shaft 112.

Figure 6:
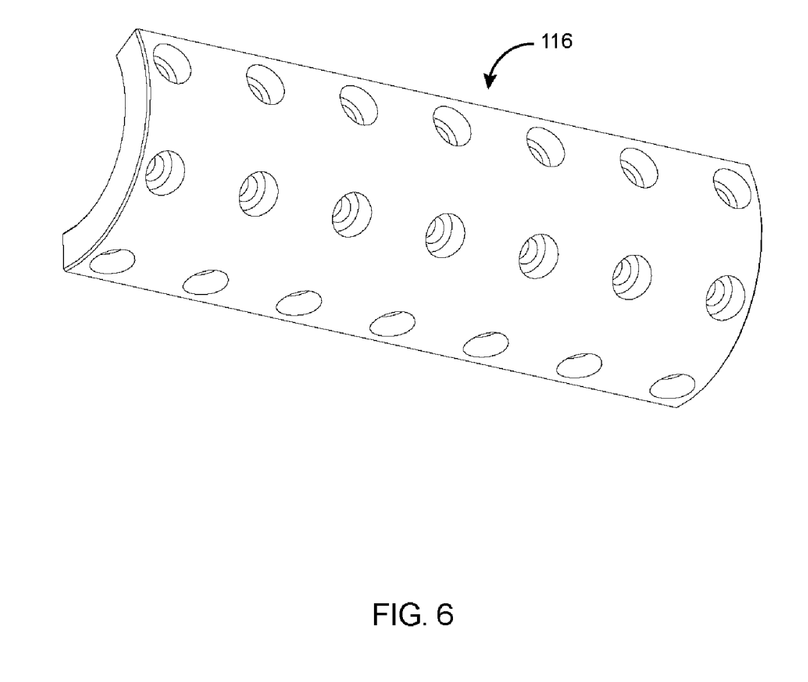
FIG. 6 is a perspective view illustrating a counterweight means of the present invention.

FIG. 6 illustrates the counterweight means 116 of the present invention. The counterweight means 116 is attached to the rotating cutter shaft 112 (shown in FIG. 1). The counterweight means 116 counterbalances the weight of the rotating cutter shaft 112 and the associated portions of the rotating cutter shaft 112.

Figure 7:
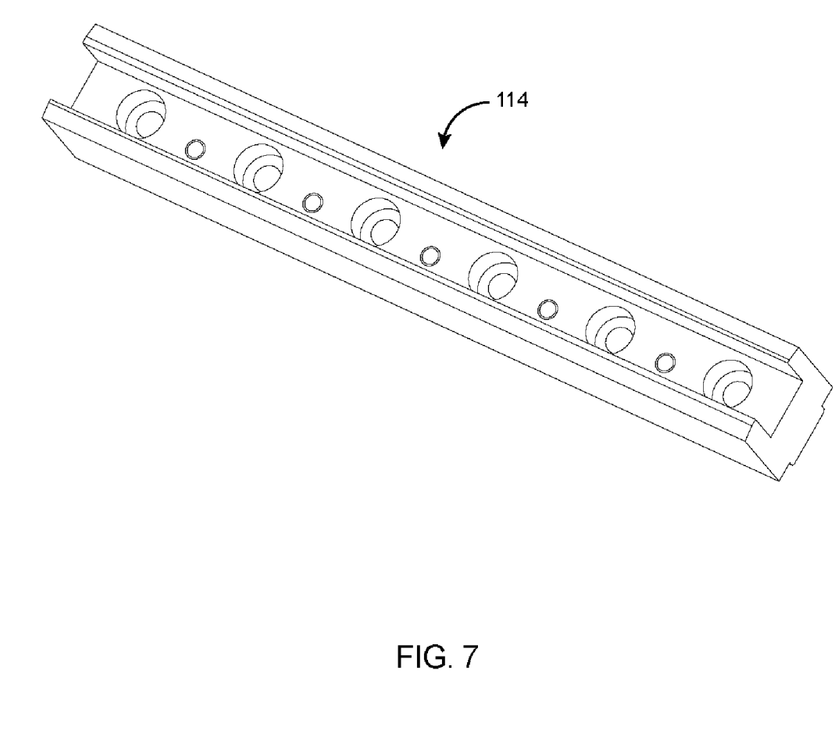
FIG. 7 is a perspective view illustrating a blade holder of the present invention.
Figure 8:
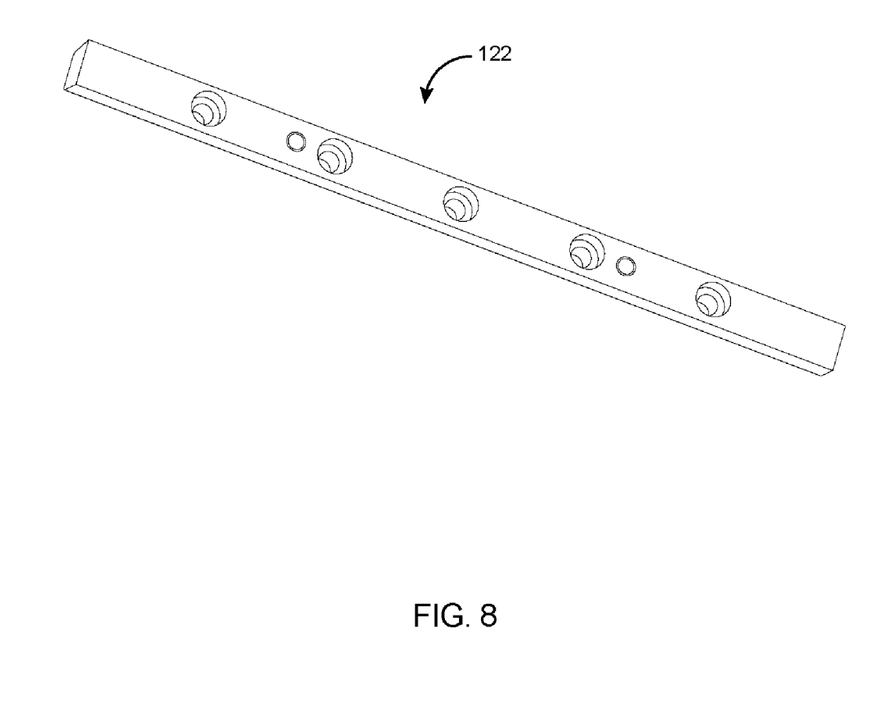
FIG. 8 is a perspective view illustrating a knife wedge of the present invention.

FIG. 7 illustrates the blade holder 114 of the present invention. The at least one cutter blade 124 (shown in FIG. 1) co-operates with a fixed blade holder 114 and is able to be operatively associated to the rotating cutter shaft 112 (shown in FIG. 1) for cutting the label web. And FIG. 8 illustrates the knife wedge 122 of the present invention. The at least one cutter blade 124 includes elongated, linear knife wedge 122 formed thereon.

Figure 9:
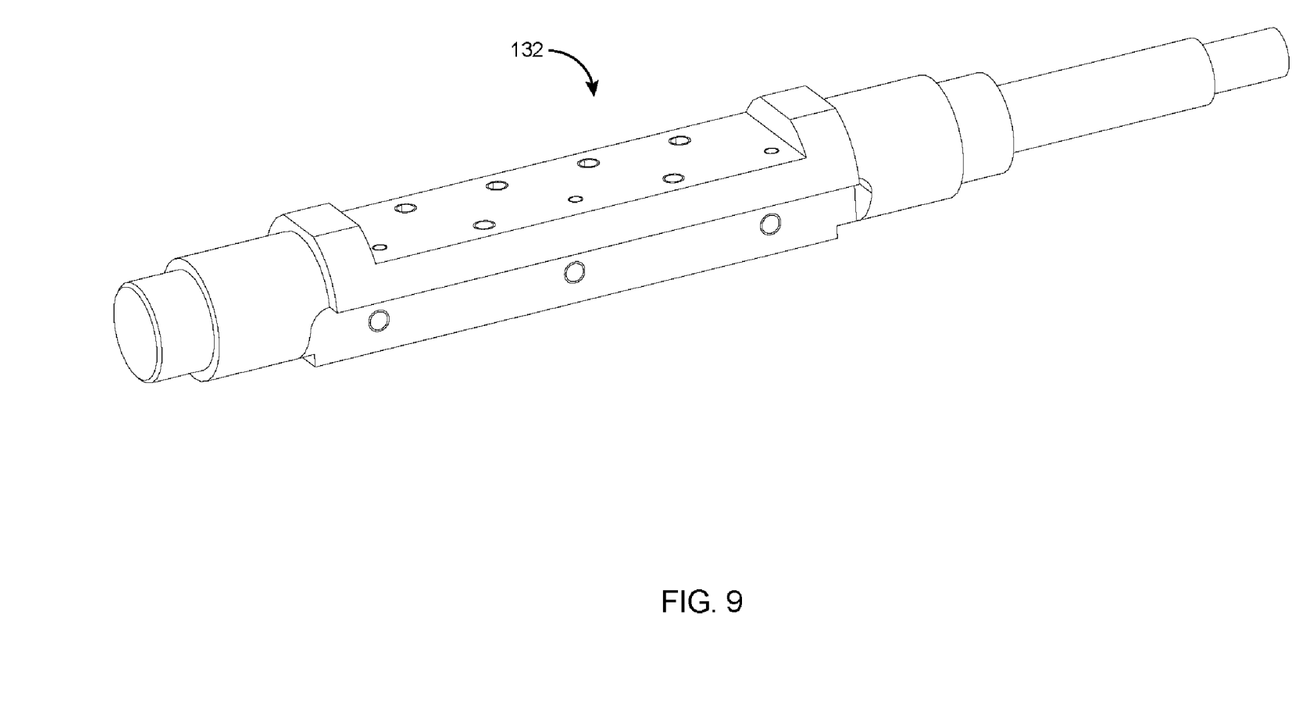
FIG. 9 is a perspective view illustrating a stationary shaft of the present invention.
Figure 11:
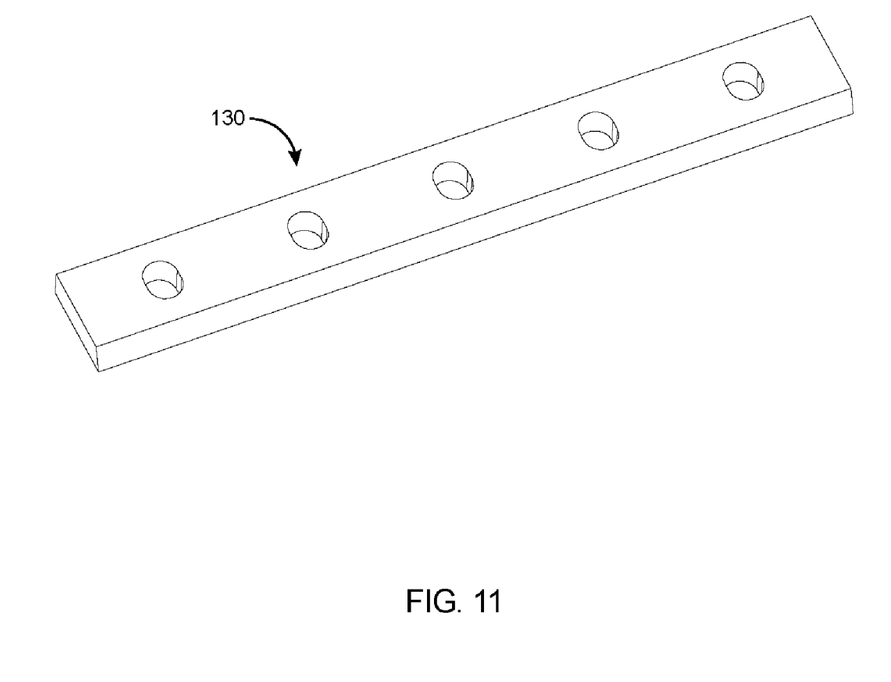
FIG. 11 is a perspective view illustrating a stationary knife of the present invention.

FIG. 9 illustrates the stationary shaft 132 and FIG. 11 illustrates the stationary knife 130 of the present invention. The stationary knife 130 protrudes from and is rotatable with the stationary shaft 132. The stationary shaft 132 includes the second axis about which it rotates.

Figure 10:
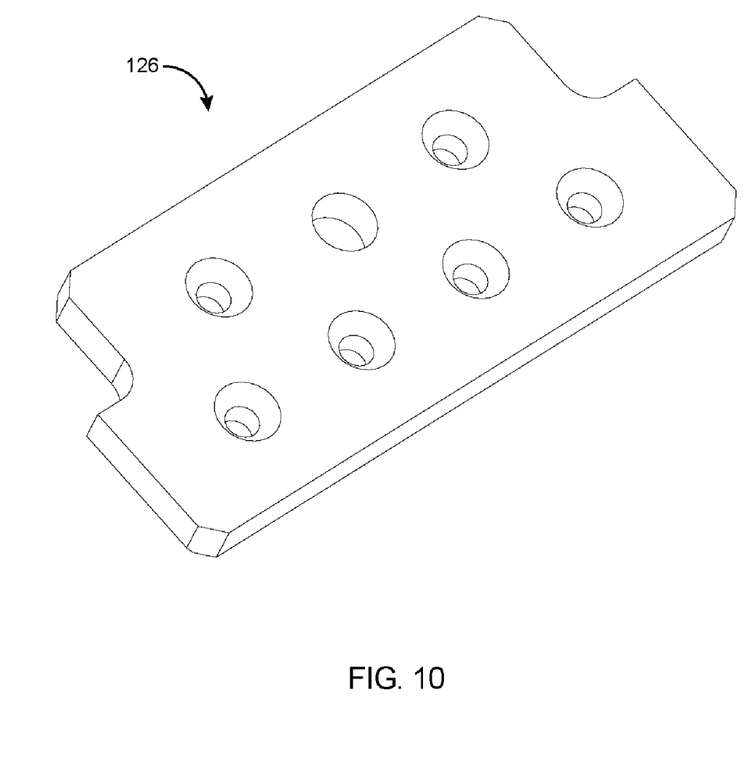
FIG. 10 is a perspective view illustrating a cutter blade of the present invention.
Figure 12:
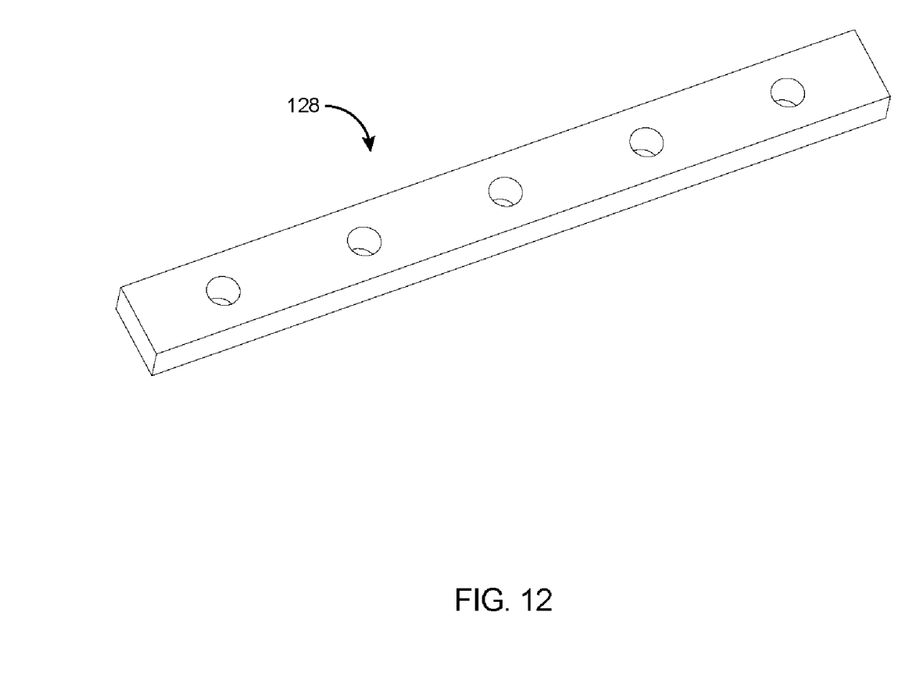
FIG. 12 is a perspective view illustrating a knife clamp of the present invention.

FIG. 10 illustrates the cutter plate 126 and FIG. 12 illustrates the knife clamp 128 of the present invention. The knife clamp 128 is mounted on the stationary shaft 132 (shown in FIG. 1) for engaging the stationary knife 130 as the stationary shaft 132 rotates to cut the label web.

Figure 13:
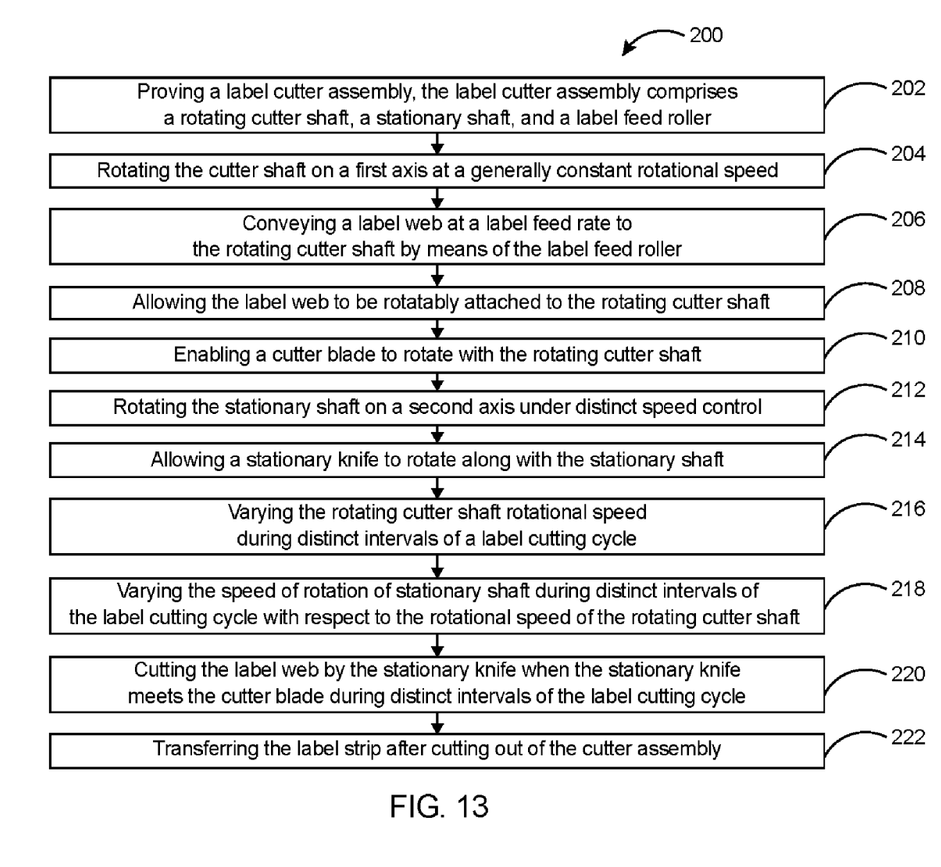
FIG. 13 is a flowchart of a method for cutting label web utilizing a cutter assembly.

FIG. 13 illustrates a flowchart of a method for cutting the label web utilizing the cutter assembly 200. The method initiates by providing the label cutter assembly, the label cutter assembly comprising the rotating cutter shaft, the stationary shaft, and the label feed roller as shown in block 202. Initially, rotating the cutter shaft on the first axis at a generally constant rotational speed as depicted in block 204. Then conveying the label web at a label feed rate to the rotating cutter shaft by means of the label feed roller as shown in block 206. Next, attaching the label web to the rotating cutter shaft as illustrated in block 208. Further, enabling the cutter blade to rotate with the rotating cutter shaft as shown in block 210. Then, rotating the stationary shaft on the second axis under distinct speed control and allowing the stationary knife to rotate along with the stationary shaft as shown in block 212 and 214. Next, varying the rotational speed of the rotating cutter shaft as well as the stationary shaft during distinct intervals of a label cutting cycle as depicted in block 216 and 218. The label web is then cut by the stationary knife when the stationary knife has a lower rotational speed during the interval in the cycle in which the stationary knife cuts the label web as shown in block 220. And finally after cutting, transferring the label strip out of the cutter assembly as shown in block 222. The method further comprising establishing the label cutting cycle as a 360° rotation of the rotating cutter shaft at a single rotation of the stationary shaft, the label web is cut at a minimum label length. The length of label strip is inversely related to frequency at which the cutter blade meets the stationary knife.

This label cutter 100 can create labels of many different lengths without requiring varying cutter diameters. The label cutter comprises servomotors 144a and 144b that independently control operative elements of a label cutter 100 such that through such control labels of multiple discrete lengths may be cut. By rotating the rotating cutter shaft 112 in a first direction, and rotating the stationary shaft 132 in any direction at the same speed, the stationary knife 130 would cut 1× for every one pass of the cutter blade 124. If the stationary knife 130 were to rotate in the same direction as the cutter blade 124, but at one half the speed, the cutter blade 124 would rotate around twice before being cut, thus creating a longer label than in the first example. If the stationary knife 130 rotated at ⅓rds the speed of the cutter blade 124, the label could be even longer. The relative speed of the cutter blade 124 is directly related to the stationary knife 130. In other examples, where the cutter blade 124 means rotates 720° compared to one rotation of the stationary knife 130, the label would be cut maximum double length (or any length up to double). The length of the label is thus inversely related to the frequency at which the cutter blade 124 and stationary knife 130. That is, the more often they meet, the shorter the label and the less often they meet, the longer the label.

In one embodiment, the diameter of the cutter blade 124 and label feed roller 156 is 5.2", based on its calculated circumference of 16.3362", that in a system where the ratio of angular velocities of the two were the same, the maximum label cut is 16.3362" long. In the present invention where the cutter blade 124 rotates at double the rate of revolutions per unit time as the label feed roller 156, the stationary knife 130 would only meet the label after maximum of 16.3362"×2 of label was fed through. The relative rates of revolutions per unit time may be controlled and thus labels of any length may be created. Also, depending on the number of rotations of the cutter blade 124 before cutting the label, any label length required may be cut. This is preferably done by controlling the stationary knife 130, which only cuts on demand. By controlling the amount of label fed by the label feed roller 156 to the rotating cutter shaft 112 and by controlling the relative speed of the cutter blade 124 and secondary knife 130 any desired label length can be cut. The two rotating shafts rotate independently of each other and could be independently controlled so either could speed up or slow down, allowing the line of labels to be cut at any desired length.

The claimed subject matter has been provided here with reference to one or more features or embodiments. Those skilled in the art will recognize and appreciate that, despite of the detailed nature of the exemplary embodiments provided here; changes and modifications may be applied to said embodiments without limiting or departing from the generally intended scope. These and various other adaptations and combinations of the embodiments provided here are within the scope of the disclosed subject matter as defined by the claims and their full set of equivalents.

The foregoing description of the preferred embodiment of the present invention has been presented for the purpose of illustration and description. It is not intended to be exhaustive or to limit the invention to the precise form disclosed. Many modifications and variations are possible in the label cutting mechanism of the above teachings. It is intended that the scope of the present invention not be limited by this detailed description, but by the claims and the equivalents to the claims appended hereto.

The invention claimed is:

1. A label cutting assembly comprising:
   a. a rotating cutter shaft having a first axis about which it rotates;
   b. a stationary knife protruding from and rotatable with a stationary shaft having a cutter plate attached thereto;
   c. at least one cutter blade co-operating with a fixed blade holder operatively associated with the rotating cutter shaft for cutting a label web into a segment having a label length; and
   d. a label feed roller positioned adjacent the rotating cutter shaft;
   e. whereby a rotational speed of the stationary knife is varied during each label cutting cycle in order to optimize control of a label length.

2. The label cutter of claim 1, wherein the stationary knife is initially offset from the cutter blade.

3. The label cutter of claim 1, wherein a frequency at which the cutter blade meets the stationary knife is inversely related to the length of the label strip produced.

4. The label cutter of claim 1, wherein the speed of rotation of stationary shaft is varied during distinct intervals of the label cutting cycle.

5. The label cutter of claim 1, wherein the rotating cutter shaft includes a label guide between which the label web is fed.

6. The label cutter of claim 1, wherein a knife clamp is mounted on the stationary shaft for engaging the stationary knife.

7. The label cutter of claim 1 wherein the stationary shaft has a second axis about which it rotates at a rotational rate less than that of the rotating cutter shaft.

8. The label cutter of claim 1, wherein a first servomotor rotatably drives the rotating cutter shaft and a second servomotor rotatably drives the stationary shaft.

9. The cutter of claim 1 wherein the rotating cutter shaft further comprises a plurality of cutter shells attached thereto.

10. A label cutting assembly comprising:
    a. a rotating cutter shaft having a first axis about which it rotates;
    b. a stationary knife protruding from and rotatable with a stationary shaft having a cutter plate attached thereto;
    c. at least one cutter blade co-operating with a fixed blade holder operatively associated with the rotating cutter shaft for cutting a label web into a segment having a label length, the at least one cutter blade having an elongated, linear knife wedge formed thereon; and
    d. a label feed roller positioned adjacent the rotating cutter shaft.

11. The label cutter of claim 10, wherein the stationary knife is initially offset from the cutter blade.

12. The apparatus of claim 10, wherein the stationary knife rotates near the cutter blade in order to cut the label web.

13. The label cutter of claim 10, wherein the speed of rotation of stationary shaft is varied during distinct intervals of the label cutting cycle.

14. The label cutter of claim 10, wherein a counterweight is attached to the rotating cutter shaft.

15. The label cutter of claim 10, whereby a rotational speed of the stationary knife is varied during each label cutting cycle in order to optimize control of a label length.

16. The label cutter of claim 10 wherein a frequency at which the cutter blade meets the stationary knife is inversely related to the length of the label strip produced.

17. A label cutting assembly comprising:
    a. a rotating cutter shaft having a first axis about which it rotates;
    b. a stationary knife protruding from and rotatable with a stationary shaft having a cutter plate attached thereto;
    c. at least one cutter blade co-operating with a fixed blade holder operatively associated with the rotating cutter shaft for cutting the label web into a segment having a label length, the at least one cutter blade having an elongated, linear knife wedge formed thereon;
    d. a knife clamp mounted on the stationary shaft for engaging the stationary knife; and
    e. a label feed roller positioned adjacent the rotating cutter shaft.

18. The label cutter of claim 17, wherein a frequency at which the cutter blade meets the stationary knife is inversely related to the length of the label strip produced.

19. The label cutter of claim 17, whereby a rotational speed of the stationary knife is varied during each label cutting cycle in order to optimize control of a label length.

20. The label cutter of claim 17 whereby the stationary shaft has a second axis about which it rotates at a rotational rate less than that of the rotating cutter shaft.

* * * * *